US010892896B2

(12) United States Patent
Lin

(10) Patent No.: US 10,892,896 B2
(45) Date of Patent: *Jan. 12, 2021

(54) USING BIOMETRIC FEATURES FOR USER AUTHENTICATION

(71) Applicant: Advanced New Technologies Co., Ltd., George Town (KY)

(72) Inventor: Junsui Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,584

(22) Filed: May 18, 2020

(65) Prior Publication Data

US 2020/0280445 A1  Sep. 3, 2020

Related U.S. Application Data

(63) Continuation of application No. 15/857,762, filed on Dec. 29, 2017, now Pat. No. 10,659,230, which is a
(Continued)

(30) Foreign Application Priority Data

Jul. 2, 2015  (CN) .......................... 2015 1 0394393

(51) Int. Cl.
  *G06F 21/00*  (2013.01)
  *H04L 9/32*  (2006.01)
  (Continued)

(52) U.S. Cl.
  CPC ............ *H04L 9/3231* (2013.01); *G06F 21/32* (2013.01); *G06F 21/33* (2013.01); *G06F 21/45* (2013.01);
  (Continued)

(58) Field of Classification Search
  CPC .......... G06F 21/31; G06F 21/32; G06F 21/45; G06F 21/33; H04L 9/0816; H04L 9/0825;
  (Continued)

(56) References Cited

U.S. PATENT DOCUMENTS

| 6,535,622 B1 | 3/2003 | Russo et al. |
| 10,659,230 B2 | 5/2020 | Lin |

(Continued)

FOREIGN PATENT DOCUMENTS

| CN | 101330386 | 12/2008 |
| CN | 101958792 | 1/2011 |

(Continued)

OTHER PUBLICATIONS

International Search Report by the International Searching Authority issued in International Application No. PCT/CN2016/086868 dated Sep. 12, 2016; 8 pages.

(Continued)

*Primary Examiner* — Edward Zee
(74) *Attorney, Agent, or Firm* — Fish & Richardson P.C.

(57) ABSTRACT

An authentication request is sent to a server. An authentication request reply message is received from the server. A biometric feature input by a user is received. A biometric feature template identifier (ID) corresponding to the received biometric feature is acquired using the received biometric feature. The acquired biometric feature template ID is compared with a stored biometric feature template ID included in an enable record that is used for biometric feature verification and created during a biometric feature verification enabling process. When the two biometric feature template IDs are consistent, an authentication response message is generated. The authentication response message is sent to the server for verification. Verification includes comparing the biometric feature template ID in the authen-
(Continued)

tication response message with the biometric feature template ID in a saved user record. The verification succeeds if the two biometric feature template IDs are consistent; otherwise an error is reported.

14 Claims, 4 Drawing Sheets

Related U.S. Application Data continuation of application No. PCT/CN2016/086868, filed on Jun. 23, 2016.

(51) Int. Cl.
*H04L 29/06* (2006.01)
*G06F 21/32* (2013.01)
*G06K 9/00* (2006.01)
*H04L 9/08* (2006.01)
*H04L 9/14* (2006.01)
*H04L 9/30* (2006.01)
*G06F 21/33* (2013.01)
*G06F 21/45* (2013.01)

(52) U.S. Cl.
CPC ..... *G06K 9/00013* (2013.01); *G06K 9/00087* (2013.01); *H04L 9/0861* (2013.01); *H04L 9/14* (2013.01); *H04L 9/30* (2013.01); *H04L 9/3247* (2013.01); *H04L 63/0861* (2013.01)

(58) Field of Classification Search
CPC ... H04L 9/0838; H04L 63/08; H04L 63/0823; H04L 63/0861
See application file for complete search history.

(56) References Cited

U.S. PATENT DOCUMENTS

| | | |
|---|---|---|
| 2003/0105966 A1 | 6/2003 | Pu |
| 2004/0005087 A1 | 1/2004 | Hillhouse |
| 2004/0250085 A1 | 12/2004 | Tattan |
| 2007/0016777 A1* | 1/2007 | Henderson ............ H04L 63/083 713/169 |
| 2008/0172725 A1 | 7/2008 | Yoshihiro et al. |
| 2009/0070860 A1 | 3/2009 | Hirata |
| 2010/0223663 A1 | 9/2010 | Hiroyuki et al. |
| 2010/0253471 A1 | 10/2010 | Abe |
| 2011/0083170 A1* | 4/2011 | Kesanupalli ......... G06Q 20/401 726/5 |
| 2011/0145904 A1 | 6/2011 | Pizano et al. |
| 2011/0314285 A1 | 12/2011 | Hirata |
| 2012/0005736 A1 | 1/2012 | Takahashi |
| 2013/0174243 A1 | 7/2013 | Inatomi et al. |
| 2013/0283057 A1 | 10/2013 | Hama |
| 2014/0337635 A1 | 11/2014 | Konvalinka |
| 2015/0007295 A1 | 1/2015 | Hou |
| 2015/0082024 A1 | 3/2015 | Smith |
| 2015/0143497 A1 | 5/2015 | Jin et al. |

FOREIGN PATENT DOCUMENTS

| | | |
|---|---|---|
| CN | 102916968 | 2/2013 |
| CN | 103368745 | 10/2013 |
| EP | 2397961 | 12/2011 |
| JP | 2001256191 | 9/2001 |
| WO | WO 2007094165 | 8/2007 |
| WO | WO 2007122726 | 11/2007 |

OTHER PUBLICATIONS

Extended European Search Report issued in European Application No. 16817193.2 dated May 28, 2018; 10 pages.
Search Report and Written Opinion by the Intellectual Property Office of Singapore issued in Singaporean Application No. 11201710590X dated Oct. 29, 2018, 7 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report on Patentability in International Application No. PCT/CN2016/086868, dated Jan. 2, 2018, 10 pages. (with English translation).

* cited by examiner

USING BIOMETRIC FEATURES FOR USER AUTHENTICATION

This application is a continuation of U.S. patent application Ser. No. 15/857,762, filed on Dec. 29, 2017, which is a continuation of PCT Application No. PCT/CN2016/086868, filed on Jun. 23, 2016, which claims priority to Chinese Patent Application No. 201510394393.3, filed on Jul. 2, 2015, and each application is incorporated by reference in its entirety.

BACKGROUND

Passwords are used for user authentication in traditional password verification processes. Every time a password is input, a risk exists of a leakage, such as through activities of malware (for example, a keylogger Trojan) or a physical viewing of the password as it is entered. The use of biometric features (such as, fingerprints, retinal patterns, voice patterns, or facial patterns) can provide a higher level of security. For example, online payment systems can be implemented to use fingerprint verification, which can improve user experience and enhance payment security.

In conventional online fingerprint verification processes, a client can send a user's fingerprint data, such as in the form of a fingerprint image or fingerprint characteristic data, to a server. The server can compare stored fingerprint data of the user with the received fingerprint data to complete verification. Because the fingerprint data needs to be transmitted to the server, a risk of leaking the fingerprint data can also exist. Leaked fingerprint data could result in problems for a user, such as security breaches, theft of monetary resources, and reputational damage. Moreover, since the fingerprint data is private data, the user may not agree to the uploading of the fingerprint data. Even if the user agrees to upload the fingerprint data, network traffic needs to be consumed during data upload. The server may also need to compare the fingerprint data, thus consuming additional computing resources and storage resources.

SUMMARY

The present disclosure describes techniques related to the field of security verification, and in particular, to user authentication based on a biometric feature in which a client and a server are used in the user authentication process. In an implementation, a computer-implemented method comprises: sending an authentication request to a server; receiving, from the server and in response to the authentication request, an authentication request reply message; receiving a biometric feature input by a user; acquiring, using the received biometric feature, a biometric feature template identifier (ID) corresponding to the received biometric feature; comparing the acquired biometric feature template ID with a stored biometric feature template ID included in an enable record, the enable record used for biometric feature verification and created during a biometric feature verification enabling process; and when the two biometric feature template IDs are consistent, generating an authentication response message that includes the acquired biometric feature template ID, and sending, to the server, the authentication response message for verification, the verification by the server including comparing the biometric feature template ID in the authentication response message with the biometric feature template ID in a saved user record, wherein the verification succeeds if the two biometric feature template IDs are consistent, otherwise an error is reported.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the use of biometric features, such as fingerprints, retinal patterns, voice patterns, or facial patterns, can result in higher security. Second, storing and checking biometric information at a client, as opposed to a server, can reduce network traffic and the risk of leaking personal biometric information. Third, fingerprint template identifiers used for verification cannot be modified by hacking or by cracking a password of the user. Fourth, even if a client of the user is lost, the user does not need to worry about fraudulent use.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
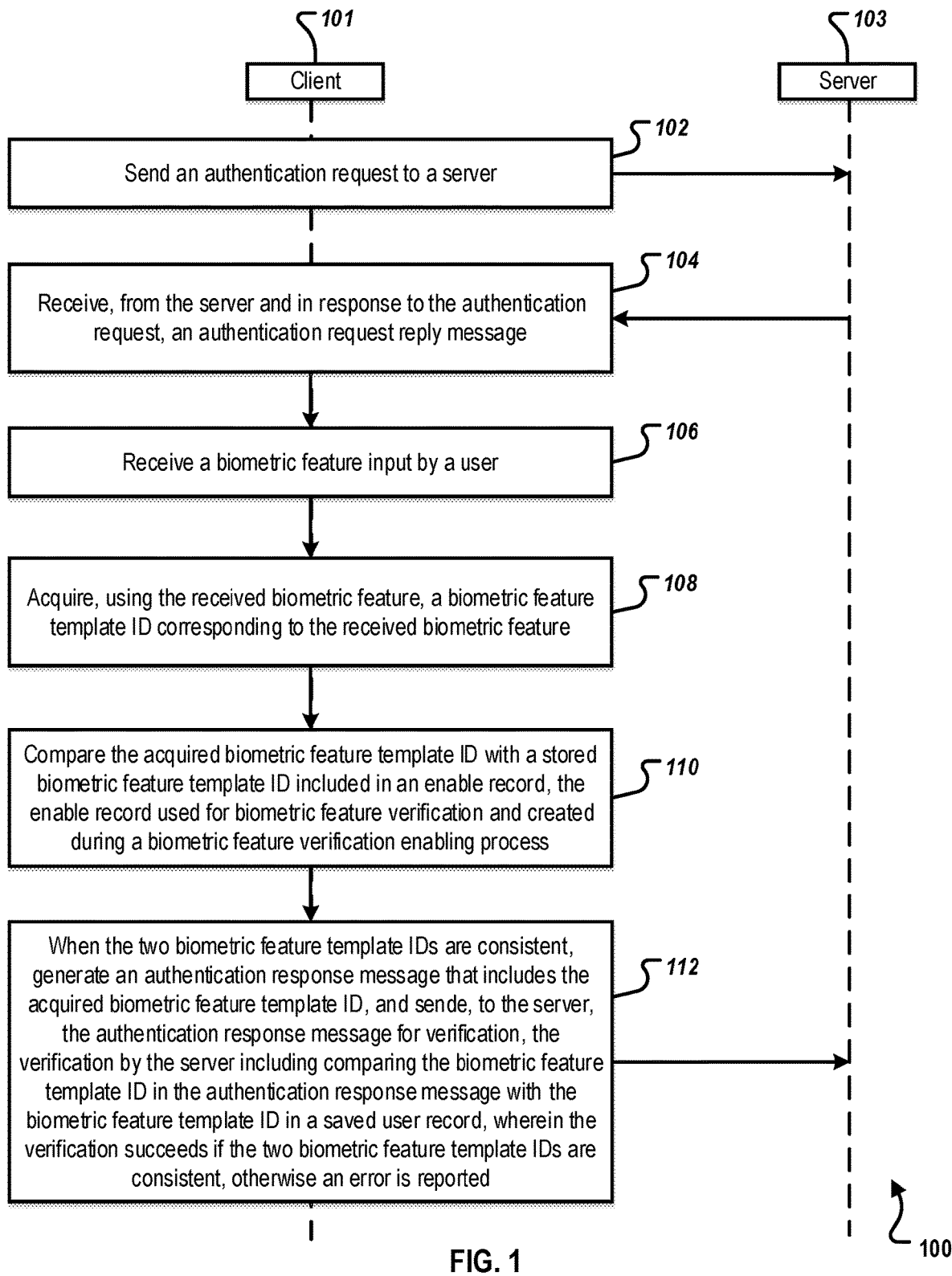
FIG. 1 is a flowchart illustrating an example of a computer-implemented method for biometric authentication of a user, according to an implementation of the present disclosure.

The following detailed description describes techniques for performing user authentication using biometric features, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

For user verification based on a biometric feature, it is common to perform identity authentication techniques such as fingerprint recognition, voice recognition, face recognition, and iris recognition. Biometric feature verification techniques can be used, for example, in access control systems or for Internet payments. The present disclosure describes fingerprint verification in Internet payments as an example to describe in detail a security verification method based on a biometric feature.

The fingerprint verification techniques described in the present disclosure initiate fingerprint comparison at a client of a user, and a result of the verification is further verified at a server. This is different from online fingerprint verification, which typically performs the comparison entirely at a server. The use of a dual client-server approach can assure the effectiveness of fingerprint verification. The client in the client-server approach can be considered to be, in some implementations, an application program that is installed on a computing device (such as, a mobile device, a computer, or another intelligent device) of the user. Some clients are already implemented as webpage-combined, fingerprint-scanning terminals or devices that are provided by service providers.

As an example, prior to making an Internet payment, a client can send an authentication request to a server in order to initiate user authentication. The server can respond by sending an authentication request reply message to the client. A biometric feature input by a user can be received by the client, such as when the user provides a fingerprint for scanning. A biometric feature template identifier (ID) corresponding to the received biometric feature can be acquired at the client using the received biometric feature. The acquired biometric feature template ID can be compared with a biometric feature template ID included in an enable record stored at the client. The enable record can be used for biometric feature verification and can be created during a biometric feature verification enabling process initiated at the client. When the two biometric feature template IDs are consistent, an authentication response message can be generated and sent to the server for verification. Verification at the server can include comparing the biometric feature template ID in the authentication response message with the biometric feature template ID in a saved user record. The verification can succeed if the two biometric feature template IDs are consistent.

FIG. 1 is a flowchart illustrating an example of a computer-implemented method 100 for biometric authentication of a user, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

During fingerprint verification, for example, as part of a payment process used to make an Internet payment, the user can place a finger on a fingerprint scanner, such as when prompted by an interface. The fingerprint scanner can produce a fingerprint image used for verification. The client can use the fingerprint image to locate a corresponding fingerprint template from stored fingerprint templates. Using the corresponding fingerprint template, the client can acquire the fingerprint template ID and find a corresponding enable record according to a user ID. The client can then compare the acquired fingerprint template ID with a fingerprint template ID in the enable record. If the acquired fingerprint template ID is consistent (such as within a threshold percentage match) with the fingerprint template ID in the enable record, then the verification is determined to be successful. Otherwise, the verification is determined to have failed, and an error can be reported.

For example, prior to making Internet payments and during a fingerprint verification enablement process, the user may provide an index finger for scanning during a fingerprint verification enablement function. An enable record can then be stored that saves a fingerprint template ID of the user's index finger. At a later time, the user can provide the same index finger for scanning during user authorization for a given Internet payment. At that time, the client can determine whether a fingerprint template ID corresponding to the scanned fingerprint matches the fingerprint template ID stored in the enable record. In this technique, the fingerprint template IDs are compared locally at the client. Further, it is unnecessary to transmit the fingerprint image of the user using a network, thus avoiding possible leakage of biometric feature data associated with the user.

At 102, an authentication request is sent to a server. For example, when the user uses an application or website that includes an Internet payment function, a fingerprint of the user may need to be verified, and the verification can first require that the client 101 send an authorization request to the server 103. From 102, method 100 proceeds to 104.

At 104, an authentication request reply message is received from the server in response to the authentication request. For example, the server 103 can send an authentication request reply message that is received by the client 101. In some implementations, the authentication request reply message sent by the server 103 can be encrypted by using a first private key. Then, the client 101 can decrypt and verify the authentication request reply message using a first public key. From 104, method 100 proceeds to 106.

At 106, a biometric feature input by a user is received. As an example, the client 101 can receive a fingerprint image used for verification. The fingerprint image can be received, for example, through the use of a fingerprint reader on the client 101 or on a fingerprint reader that is communicatively coupled to the client 101. From 106, method 100 proceeds to 108.

At 108, using the received biometric feature, a biometric feature template ID corresponding to the received biometric feature is acquired. For example, the client 101 can acquire a fingerprint template ID corresponding to the fingerprint image, such as from an enable record stored on the client 101. From 108, method 100 proceeds to 110.

At 110, the acquired biometric feature template ID is compared with a stored biometric feature template ID included in an enable record that is used for biometric feature verification and created during a biometric feature verification enabling process. For example, the client 101 can compare the fingerprint template ID with a fingerprint template ID stored in the enable record. The enable record be created, for example, using method 200 described with reference to FIG. 2. In some implementations, the authentication request reply message can include a user ID that is used to distinguish between users and between devices of the users. The client 101 can search locally for an enable record corresponding to the user ID and can compare the acquired fingerprint template ID with the fingerprint template ID in the enable record. In addition, the authentication response message can include a device ID, the user ID, and the fingerprint template ID. Additionally, the server 103 can find a corresponding user record consistent with the authentication response message, and the server 103 can compare the fingerprint template ID with that in the corresponding locally-saved user record. From 110, method 100 proceeds to 112.

At 112, when the two biometric feature template IDs are consistent, an authentication response message is generated that includes the acquired biometric feature template ID, and the authentication response message is sent to the server for verification. For example, the client 101 can generate the authentication response message including the acquired fingerprint template ID, and the client 101 can send the authentication response message to the server 103. After the server 103 receives the authentication response message, the server 103 can compare the fingerprint template ID included in the authentication response message with the fingerprint template ID in a corresponding server-stored user record. The verification can succeed if the two biometric feature template IDs are consistent; otherwise an error can be reported. After 112, method 100 stops.

In some implementations, the client 101 can select the signature algorithm according to the challenge value, and the client 101 can sign the authentication response message by using the selected signature algorithm and the user private key. After receiving the authentication response message, the server 103 can also select a signature algorithm according to the challenge value and can verify the authentication response message by using the signature algorithm and the user public key.

In some implementations, the signature algorithm can be selected according to a random number. Further, a combination of multiple algorithms can be used to perform a signing operation. For example, different signature algorithms can be used for each of a one's-place digit and a ten's-place digit of the random number. Signature security can be further enhanced through two successive signing operations. In this example, because a random signature algorithm is used for the signature verification on the response message, an attacker does not know the signature algorithm even if the user private key is leaked, and cannot counterfeit the response message.

Figure 2:
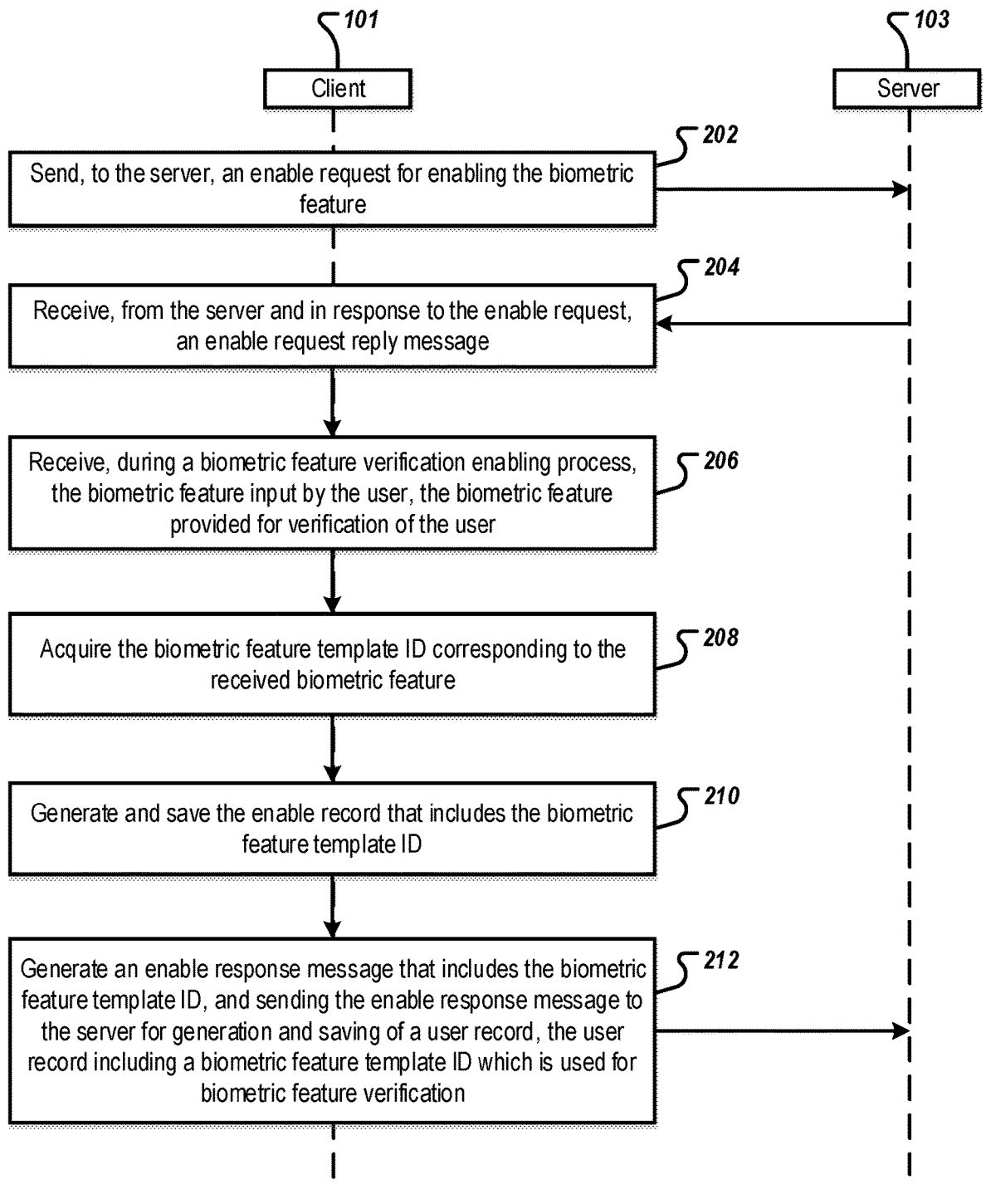
FIG. 2 is a flowchart illustrating an example of a computer-implemented method for enabling biometric authentication of a user, according to an implementation of the present disclosure.

FIG. 2 is a flowchart illustrating an example of a computer-implemented method 200 for enabling biometric authentication of a user, according to an implementation of the present disclosure. For example, for fingerprint verification to occur an Internet payment, such as in method 100, authentication must first be enabled, such as by method 200. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, an enable request for enabling the biometric feature is sent to the server. For example, the client 101 can send an enable request for enabling fingerprint verification to the server 103. In this way, enabling fingerprint verification is initiated at the client 101. From 202, method 200 proceeds to 204.

At 204, an enable request reply message is received from the server in response to the enable request. For example, after receiving the enable request for enabling fingerprint verification, the server 103 can send an enable request reply message to the client 101. In some implementations the enable request reply message can be encrypted, and after receiving the enable request reply message, the client 101 can verify the enable request reply message. A server public key and a private key pair can be used that include a first public key and a first private key that is agreed upon by the client 101 and the server 103. The first public key can be saved on the client 101, and the first private key can be saved on the server 103. The server 103 can encrypt the enable request reply message by using the first private key and then can send the encrypted message to the client 101. The client 101 can decrypt the message by using the first public key and perform verification. Encryption algorithms that are used can include, for example, symmetric algorithms, asymmetric algorithms, or abstract algorithms. Subsequent steps of method 200 can be performed if the verification succeeds, otherwise an error can be reported and method 200 stopped, redirected, or reset.

In some implementations, the client 101 can verify the enable request reply message by using the first public key. For example, after receiving the enable request reply message, the client 101 can decrypt the message by using the first public key and performs verification. Subsequent steps are performed if the verification succeeds, otherwise an error is reported. It implementations in which a security requirement is not a high priority, the process of verifying the enable request reply message can be omitted. Further, the first public key and the first private key can remain unchanged for any client.

In some implementations, if multiple users share and register with the same client 101, for example, the enable record can include a user ID that can be used to distinguish between enable records of different users. The enable request reply message can then include the user ID, thus effectively ensuring that the enable record records a correct user ID and a corresponding fingerprint template ID. In some implementations, the enable request reply message can be encrypted and signed, thus effectively preventing the enable request reply message from being tampered with during transmission. From 204, method 200 proceeds to 206.

At 206, the biometric feature input by the user and provided for verification of the user is received during a biometric feature verification enabling process. For example, after receiving the enable request reply message, the client 101 can receive a fingerprint image produced from a fingerprint provided by the user and used for verification. Continuing with the previous example, the fingerprint image can be obtained by scanning the user's index finger when placed on a fingerprint scanning device. A fingerprint feature that is extracted from the fingerprint image can be used as a fingerprint template by which to differentiate from other fingerprint templates derived from other users. From 206, method 200 proceeds to 208.

At 208, the biometric feature template ID corresponding to the received biometric feature is acquired. For example, the client 101 can generate a new biometric feature template ID for the fingerprint template. From 208, method 200 proceeds to 210.

At 210, the enable record that includes the biometric feature template ID is generated and saved. For example, the client 101 can generate and store an enable record that includes a fingerprint template ID used by the user for fingerprint verification during enabling of the fingerprint verification. The fingerprint template ID can later be compared with an input fingerprint template ID in a subsequent fingerprint verification step in order to determine whether the input fingerprint template ID is consistent with the original fingerprint template ID. In this way, only the fingerprint template ID determined during enabling of the verification can be used in the subsequent verification. From 210, method 200 proceeds to 212.

At 212, an enable response message is generated that includes the biometric feature template ID, and the enable response message is sent to the server for generation and saving of a user record. The user record includes a biometric feature template ID which is used for biometric feature verification. For example, the client 101 can generate an enable response message that includes the fingerprint template ID in the enable record, and the client 101 can send the enable response message to the server 103. Using the received enable response message, the server 103 can generate and save a user record that includes the fingerprint template ID of the user. After 212, method 200 stops.

In some implementations (such as, when the user has multiple computing devices), in order to distinguish between different devices, the enable response message can include a device ID to further distinguish between different devices of the user. The server 103 can store a user record including a user ID, a device ID, and a fingerprint template ID. When the user has multiple devices, the server can save different user records corresponding to the different devices of the user in order to implement recognition and verification. Likewise, when the user uses different devices, the different devices of the user can be distinguished from one another in order to perform verification. In this example, during user verification, a corresponding enable record and user record can further be searched for according to the device ID, and verification can be performed by comparing the fingerprint template ID with those in the matched enable record and user record.

In some implementations, in order to further avoid a replay attack in the verification process, the enable process of this embodiment can include a challenge-response feature that is used to enhance the security. For example, the enable request reply message can include a challenge value. After receiving the enable request from the client 101, the server 103 can generate a challenge value, and the server 103 can send the enable request reply message carrying the challenge value to the client 101. In a subsequent step, verification can be performed by verifying a response value. The challenge value can be generated in an identity authentication process by using a random algorithm. For generation of a random number, a strong random algorithm can be used, and acquired random numbers can be distributed more evenly. After receiving the enable request reply message, the client can generate a response value. The enable response message that is sent to the server 103 can include the response value.

In some implementations, the client 101 can select a signature algorithm according to the challenge value included in the enable request reply message, and the client 101 can generate a user public key and a private key pair. The saved enable record can include the user private key. The enable response message can be signed using the selected signature algorithm and an agreed-to second private key. The enable response message can be verified using a signature algorithm selected according to the challenge value and an agreed-to second public key. A user record including the user public key can be saved after the verification succeeds, or an error can be reported if the verification fails.

In some implementations, a modulo technique can be used to select the signature algorithm according to the received challenge value. For example, in a modulo 4 technique, one of four signature algorithms can be selected from a group that includes a signature algorithm 1, a signature algorithm 2, a signature algorithm 3, and a signature algorithm 4. The algorithm that is selected can be based on a remainder obtained after division of the challenge value. If the reminder is 0 after the challenge value is divided by 4, the signature algorithm 1 can be selected. Remainders of 1, 2, and 3 cause selection of signature algorithm 2, 3, and 4, respectively.

In some implementations, specific signature algorithms that are used can include Rivest Shamir Adleman (RSA) algorithms and secure hash algorithms (SHAs) such as RSA-SHA1 or RSA-SHA256. Such signature algorithms can correspond to a uniform user public and private key generation algorithm. A pair of user public and private keys can be generated when the verification function is enabled, and the pair can be used for encryption and decryption in subsequent fingerprint verification. Thus, each user can have their own user public and private key pair, where the user public and private key pair includes a user private key and a user public key.

In some implementations, the signature algorithm can be selected according to a remainder obtained after division of the challenge value. The signature algorithm can also be selected directly according to the ones-place digit and the tens-place digit of the challenge value, or according to a value obtained by dividing the challenge value by a predetermined modulo value (such as 4).

In some implementations, before the enable response message is sent, the enable response message can be signed using the selected signature algorithm and the agreed-to second private key. For example, the second private key can be determined by the client 101. Correspondingly, the server 103 can have a corresponding second public key.

In some implementations, the process of verifying the enable response message by the server can include the following two verification steps. First, the signature can be verified by using the second public key and the signature algorithm. For example, at the server, the challenge value can be divided by using a method that is the same as that used by the client to obtain a remainder. A corresponding signature algorithm can be selected, and the signed response message can be verified according to the agreed-to second public key. Second, a response value can be calculated by using the same algorithm that used by the client, and verification can be performed by comparing the obtained response value with a response value in the response message.

In some implementations, in a fingerprint verification process, after receiving the enable request reply message, the client 101 can be required to generate a response message and return the response message to the server 103. For example, the response message can include a response value that is calculated by using a fixed algorithm according to the challenge value. In this way, the server can calculate a response value according to the same algorithm and can then perform verification by comparing the response values. After the verification succeeds, the server 103 can save a corresponding user record. The user record saved by the server 103 can include a user ID, a device ID, a user public key, and a fingerprint template ID.

In some implementations, the enable request reply message can include a user ID and a challenge value. The enable record can include a user private key, the user ID, and a fingerprint template ID. The enable response message can include a user public key, the user ID, a device ID, and the fingerprint template ID. The user record saved by the server can include the user ID, the device ID, the fingerprint template ID, and the user public key.

Figure 3:
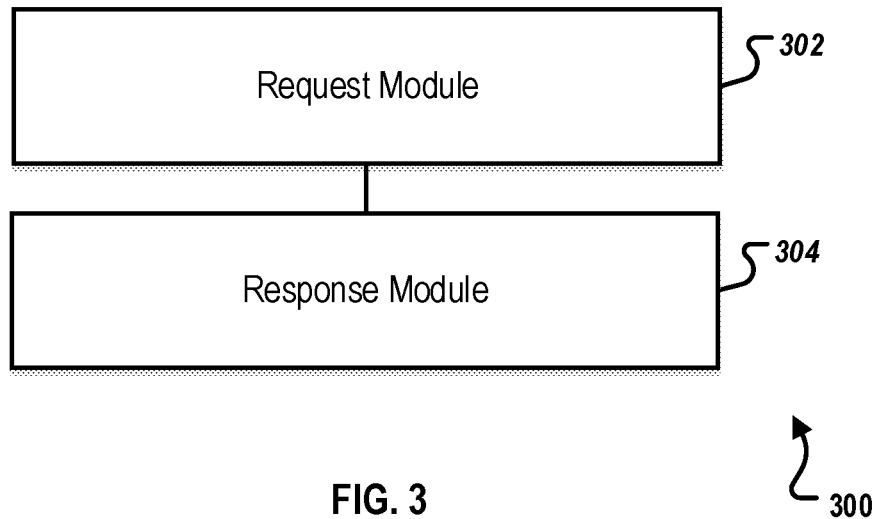
FIG. 3 is a block diagram illustrating an example of client-side modules of an identity authentication system, according to an implementation of the present disclosure.

FIG. 3 is a block diagram 300 illustrating an example of client-side modules of an identity authentication system, according to an implementation of the present disclosure. In addition to modules 302 and 304, the identity authentication system can include the client 101 and the server 103. The client 101 can save enable records, and the server 103 can save user records. Both the enable records and the user records include a biometric feature template ID which is used for biometric feature verification and is acquired in a process of enabling the biometric feature verification.

A request module 302 that is included in the identity authentication system can be configured to send an authentication request to the server 103 and receive an authentication request reply message returned by the server 103.

A response module 304 that is included in the identity authentication system can be configured to receive a biometric feature input by a user, acquire a biometric feature template ID corresponding to the biometric feature, compare the acquired biometric feature template ID with the biometric feature template ID in the locally saved enable record, and generate an authentication response message including the acquired biometric feature template ID if the two biometric feature template IDs are consistent. The response module 304 is also configured to send the authentication response message to the server 103. The server 103 can perform verification by comparing the biometric feature template ID with the biometric feature template ID in the locally saved user record. The server 103 can report an error if the two biometric feature template IDs are inconsistent.

The request module 302 can be further configured to send an enable request for enabling the biometric feature verification to the server, and receive an enable request reply message returned by the server. The response module 304 can be further configured to receive the biometric feature used for verification and input by the user, acquire the biometric feature template ID corresponding to the biometric feature used for verification, generate and save the enable record, generate an enable response message including the biometric feature template ID, and send the enable response message to the server. The server can receive the enable response message, acquire the biometric feature template ID included in the message, and generate and save the user record.

Further, the server 103 can sign the authentication request reply message or the enable request reply message by using an agreed-to first private key. The request module 302 can be further configured, after receiving the authentication request reply message, to verify the received authentication request reply message by using an agreed-to first public key. A subsequent response can be made when the verification succeeds; otherwise an error can be reported. The request module 302 can be further configured, after receiving the enable request reply message, to verify the received enable request reply message by using the agreed-to first public key. A subsequent response can be made when the verification succeeds; otherwise an error can be reported.

Figure 4:
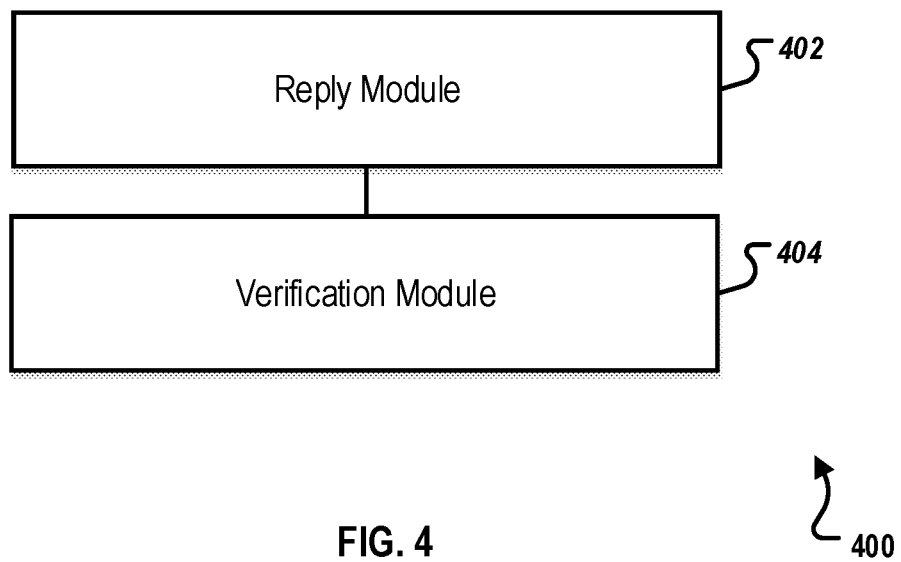
FIG. 4 is a block diagram illustrating an example of server-side modules of an identity authentication system, according to an implementation of the present disclosure.

FIG. 4 is a block diagram 400 illustrating an example of server-side modules of the identity authentication system, according to an implementation of the present disclosure. A reply module 402 can be configured to receive an authentication request from the client 101 and send an authentication request reply message to the client 101. A verification module 404 can be configured to receive an authentication response message from the client 101. The verification module 404 is also configured to perform verification by comparing the biometric feature template ID in the authentication response message with the biometric feature template ID in the saved user record, where the verification succeeds if the two biometric feature template IDs are consistent.

The reply module 402 can be further configured to receive, from the client 101, an enable request for enabling the biometric feature verification and send, to the client 101, an enable request reply message. The client 101 can acquire, according to a biometric feature used for verification and input by a user, a biometric feature template ID corresponding to the biometric feature used for verification. The client 101 can then generate and save an enable record. The verification module 404 can be further configured to receive an enable response message from the client, acquire the biometric feature template ID included in the enable response message, and generate and save the user record.

The reply module 402 can be further configured to sign the authentication request reply message or the enable request reply message by using an agreed-to first private key. The client 101 can verify the received authentication request reply message by using an agreed-to first public key.

The verification module 404 can be further configured to receive the enable response message signed by the client by using a selected signature algorithm and an agreed-to second private key. The signature algorithm can be selected by the client 101 according to the challenge value in the enable request reply message, and the enable response message can include a user public key. The verification module 404 can be further configured to select a signature algorithm according to the challenge value and verify the enable response message by using a second public key.

The verification module 404 can be further configured to receive the authentication response message signed by the client by using a selected signature algorithm and the user private key, where the signature algorithm is selected by the client 101 according to the challenge value in the authentication request reply message. The verification module 404 can be further configured to select a signature algorithm according to the challenge value, and verify the signature on the authentication response message by using the signature algorithm and the user public key.

Further, the enable request reply message further includes a user ID, so that the client saves the user ID in the enable record after receiving the enable request reply message. The enable response message generated by the client further includes the user ID. After receiving the enable response message, the verification module 404 can be further configured to acquire the user ID from the enable response message and save the user ID in the user record. The verification module 404 can be further configured to acquire the device ID when included in the enable response message and save the device ID in the user record. The verification module 404 can be further configured to acquire the user ID when included in the authentication response message and search for the corresponding user record according to the user ID. The verification module 404 can be further configured to acquire the device ID when included in the authentication response message and search for the corresponding user record according to the device ID.

Figure 5:
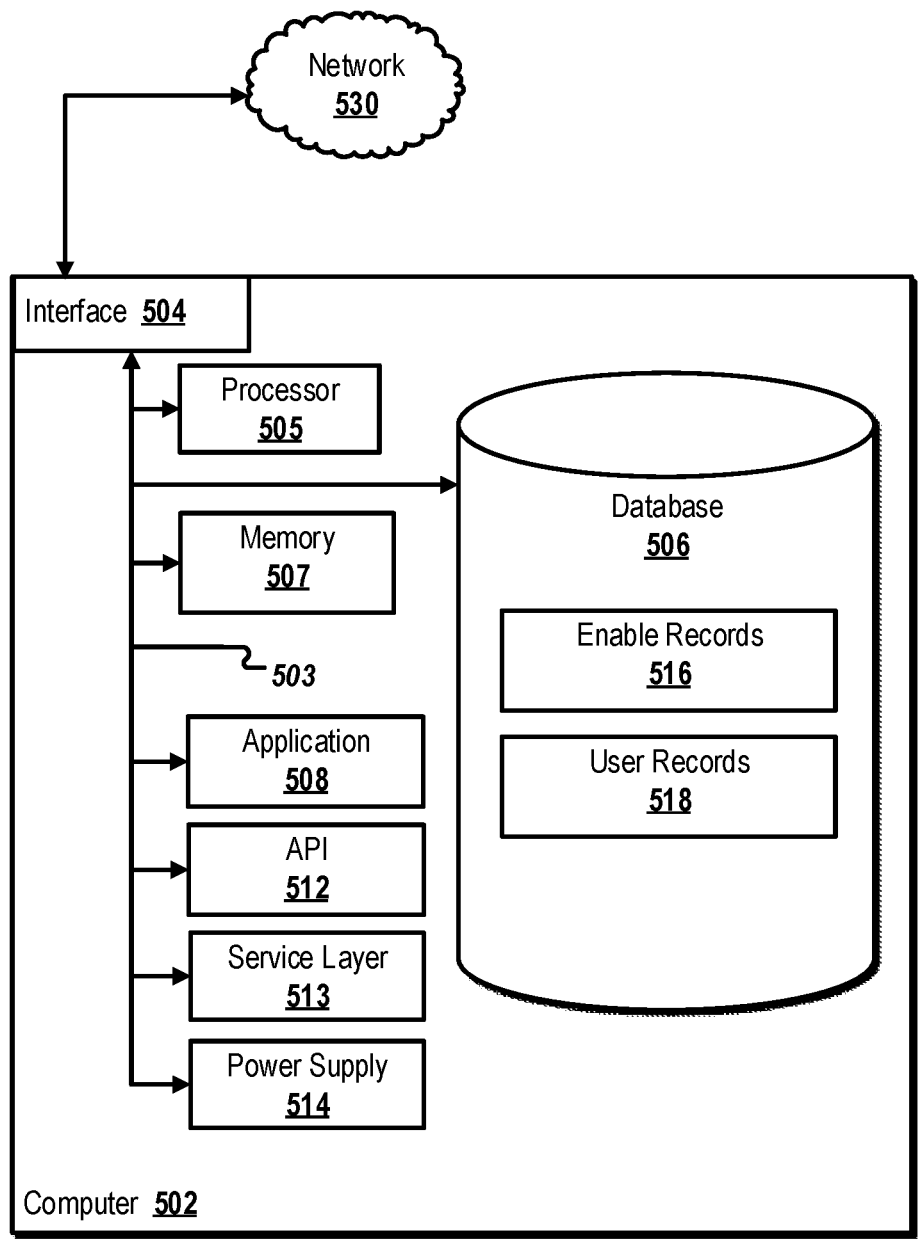
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 502 can include an input device, such as a keypad, keyboard, touch screen, another input device, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as a client, network component, a server, a database or another persistency, another role, or a combination of roles for performing the subject matter described in the present disclosure. The illustrated Computer 502 is communicably coupled with a Network 530. In some implementations, one or more components of the Computer 502 can be configured to operate within an environment, including cloud-computing-based, local, global, another environment, or a combination of environments.

At a high level, the Computer 502 is an electronic computing device operable to receive, transmit, process, store, or manage data and information associated with the described subject matter. According to some implementations, the Computer 502 can also include or be communicably coupled with a server, including an application server, e-mail server, web server, caching server, streaming data server, another server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory, conventional, or another type of database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502. As illustrated, the Database 506 holds the previously described enable records 516, stored at the client 101, and user records 518, stored at the server 103.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method comprising: sending an authentication request to a server; receiving, from the server and in response to the authentication request, an authentication request reply message; receiving a biometric feature input by a user; acquiring, using the received biometric feature, a biometric feature template identifier (ID) corresponding to the received biometric feature; comparing the acquired biometric feature template ID with a stored biometric feature template ID included in an enable record, the enable record used for biometric feature verification and created during a biometric feature verification enabling process; and when the two biometric feature template IDs are consistent, generating an authentication response message that includes the acquired biometric feature template ID, and sending, to the server, the authentication response message for verification, the verification by the server including comparing the biometric feature template ID in the authentication response message with the biometric feature template ID in a saved user record, wherein the verification succeeds if the two biometric feature template IDs are consistent, otherwise an error is reported.

The foregoing and other described implementations can each, optionally, include one or more of the following features:

A first feature, combinable with any of the following features, the method further comprising: sending, to the server, an enable request for enabling the biometric feature; receiving, from the server and in response to the enable request, an enable request reply message; receiving, during a biometric feature verification enabling process, the biometric feature input by the user, the biometric feature provided for verification of the user; acquiring the biometric feature template ID corresponding to the received biometric feature; generating and saving the enable record that includes the biometric feature template ID; and generating an enable response message that includes the biometric feature template ID, and sending the enable response message to the server for generation and saving of a user record, the user record including a biometric feature template ID which is used for biometric feature verification.

A second feature, combinable with any of the previous or following features, the method further comprising: after receiving the authentication request reply message, the computer-implemented method further comprising, verifying the received authentication request reply message by using an agreed-to first public key, wherein a subsequent response is made only when the verification succeeds, otherwise an error is reported; and after the client receives the enable request reply message, the method further comprises, verifying the received enable request reply message by using the agreed-to first public key, wherein a subsequent response is made only when the verification succeeds, otherwise an error is reported, and wherein the authentication request reply message and the enable request reply message are signed by the server by using an agreed-to first private key.

A third feature, combinable with any of the previous or following features, the method further comprising: generating a user public key and private key pair comprising a user private key and a user public key, and saving the user private key; selecting a signature algorithm according to a challenge value included in the enable request reply message; signing the generated enable response message by using the selected signature algorithm and an agreed-to second private key; and sending the signed enable response message to the server, wherein the enable response message includes the user public key, the server verifying the enable response message by using the agreed-to second public key, the user public key being saved in the server.

A fourth feature, combinable with any of the previous or following features, the method further comprising: selecting a signature algorithm according to a challenge value included in authentication request reply message; and signing the authentication response message by using the selected signature algorithm and the user private key, the server selecting a signature algorithm according to the challenge value after receiving the authentication response message and verifying the authentication response message by using the signature algorithm and the user public key, the verification including verifying the signature on the authentication response message by using the signature algorithm and the user public key.

A fifth feature, combinable with any of the previous or following features, wherein the enable request reply message further comprises a user ID, the computer-implemented method further comprising after receiving the enable request reply message, saving the user ID in the enable record, wherein the enable response message further comprises the user ID, and wherein the server, after receiving the enable response message, acquires the user ID and saves the user ID in the user record.

A sixth feature, combinable with any of the previous or following features, wherein the enable response message further includes a client device ID, and wherein the server, after receiving the enable request reply message, acquires the device ID and saves the device ID in the user record.

A seventh feature, combinable with any of the previous or following features, wherein the authentication request reply message further comprises the user ID, the computer-implemented method further comprising after receiving the biometric feature input by a user and acquiring the biometric feature template ID corresponding to the biometric feature, searching for a corresponding enable record according to the user ID, comparing the acquired biometric feature template ID with the biometric feature template ID in the found enable record, wherein the generated authentication response message further includes the user ID, and wherein, after receiving the authentication response message, the server acquires the user ID and searches for the corresponding user record according to the user ID.

An eighth feature, combinable with any of the previous or following features, wherein the authentication response message further comprises the client device ID, and wherein the server, after receiving the authentication response message, acquires the device ID and searches for the corresponding user record according to the device ID.

In a second implementation, a non-transitory, computer-readable medium storing one or more instructions executable by a computer system to perform operations comprising: sending an authentication request to a server; receiving, from the server and in response to the authentication request, an authentication request reply message; receiving a biometric feature input by a user; acquiring, using the received biometric feature, a biometric feature template identifier (ID) corresponding to the received biometric feature; comparing the acquired biometric feature template ID with a stored biometric feature template ID included in an enable record, the enable record used for biometric feature verification and created during a biometric feature verification enabling process; and when the two biometric feature template IDs are consistent, generating an authentication response message that includes the acquired biometric feature template ID, and sending, to the server, the authentication response message for verification, the verification by the server including comparing the biometric feature template ID in the authentication response message with the biometric feature template ID in a saved user record, wherein the verification succeeds if the two biometric feature template IDs are consistent, otherwise an error is reported.

The foregoing and other described implementations can each, optionally, include one or more of the following features:

A first feature, combinable with any of the following features, the operations further comprising: sending, to the server, an enable request for enabling the biometric feature; receiving, from the server and in response to the enable request, an enable request reply message; receiving, during a biometric feature verification enabling process, the biometric feature input by the user, the biometric feature provided for verification of the user; acquiring the biometric feature template ID corresponding to the received biometric feature; generating and saving the enable record that includes the biometric feature template ID; and generating an enable response message that includes the biometric feature template ID, and sending the enable response message to the server for generation and saving of a user record, the user record including a biometric feature template ID which is used for biometric feature verification.

A second feature, combinable with any of the previous or following features, the operations further comprising: after receiving the authentication request reply message, the computer-implemented method further comprising, verifying the received authentication request reply message by using an agreed-to first public key, wherein a subsequent response is made only when the verification succeeds, otherwise an error is reported; and after the client receives the enable request reply message, the method further comprises, verifying the received enable request reply message by using the agreed-to first public key, wherein a subsequent response is made only when the verification succeeds, otherwise an error is reported, and wherein the authentication request reply message and the enable request reply message are signed by the server by using an agreed-to first private key.

A third feature, combinable with any of the previous or following features, the operations further comprising: generating a user public key and private key pair comprising a user private key and a user public key, and saving the user private key; selecting a signature algorithm according to a challenge value included in the enable request reply message; signing the generated enable response message by using the selected signature algorithm and an agreed-to second private key; and sending the signed enable response message to the server, wherein the enable response message includes the user public key, the server verifying the enable response message by using the agreed-to second public key, the user public key being saved in the server.

A fourth feature, combinable with any of the previous or following features, the operations further comprising: selecting a signature algorithm according to a challenge value included in authentication request reply message; and signing the authentication response message by using the selected signature algorithm and the user private key, the server selecting a signature algorithm according to the challenge value after receiving the authentication response message and verifying the authentication response message by using the signature algorithm and the user public key, the verification including verifying the signature on the authentication response message by using the signature algorithm and the user public key.

A fifth feature, combinable with any of the previous or following features, wherein the enable request reply message further comprises a user ID, the computer-implemented method further comprising after receiving the enable request reply message, saving the user ID in the enable record, wherein the enable response message further comprises the user ID, and wherein the server, after receiving the enable response message, acquires the user ID and saves the user ID in the user record.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: sending an authentication request to a server; receiving, from the server and in response to the authentication request, an authentication request reply message; receiving a biometric feature input by a user; acquiring, using the received biometric feature, a biometric feature template identifier (ID) corresponding to the received biometric feature; comparing the acquired biometric feature template ID with a stored biometric feature template ID included in an enable record, the enable record used for biometric feature verification and created during a biometric feature verification enabling process; and when the two biometric feature template IDs are consistent, generating an authentication response message that includes the acquired biometric feature template ID, and sending, to the server, the authentication response message for verification, the verification by the server including comparing the biometric feature template ID in the authentication response message with the biometric feature template ID in a saved user record, wherein the verification succeeds if the two biometric feature template IDs are consistent, otherwise an error is reported.

The foregoing and other described implementations can each, optionally, include one or more of the following features:

A first feature, combinable with any of the following features, the operations further comprising: sending, to the server, an enable request for enabling the biometric feature; receiving, from the server and in response to the enable request, an enable request reply message; receiving, during a biometric feature verification enabling process, the biometric feature input by the user, the biometric feature provided for verification of the user; acquiring the biometric feature template ID corresponding to the received biometric feature; generating and saving the enable record that includes the biometric feature template ID; and generating an enable response message that includes the biometric feature template ID, and sending the enable response message to the server for generation and saving of a user record, the user record including a biometric feature template ID which is used for biometric feature verification.

A second feature, combinable with any of the previous or following features, the operations further comprising: after receiving the authentication request reply message, the computer-implemented method further comprising, verifying the received authentication request reply message by using an agreed-to first public key, wherein a subsequent response is made only when the verification succeeds, otherwise an error is reported; and after the client receives the enable request reply message, the method further comprises, verifying the received enable request reply message by using the agreed-to first public key, wherein a subsequent response is made only when the verification succeeds, otherwise an error is reported, and wherein the authentication request reply message and the enable request reply message are signed by the server by using an agreed-to first private key.

A third feature, combinable with any of the previous or following features, the operations further comprising: generating a user public key and private key pair comprising a user private key and a user public key, and saving the user private key; selecting a signature algorithm according to a challenge value included in the enable request reply message; signing the generated enable response message by using the selected signature algorithm and an agreed-to second private key; and sending the signed enable response message to the server, wherein the enable response message includes the user public key, the server verifying the enable response message by using the agreed-to second public key, the user public key being saved in the server.

A fourth feature, combinable with any of the previous or following features, the operations further comprising: selecting a signature algorithm according to a challenge value included in authentication request reply message; and signing the authentication response message by using the selected signature algorithm and the user private key, the server selecting a signature algorithm according to the challenge value after receiving the authentication response message and verifying the authentication response message by using the signature algorithm and the user public key, the verification including verifying the signature on the authentication response message by using the signature algorithm and the user public key.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
sending, to a server, an enable request for enabling a biometric feature;
receiving, from the server and in response to the enable request, an enable request reply message;
verifying the enable request reply message using an agreed-to first public key, wherein the enable request reply message is signed by the server using an agreed-to first private key;
receiving, during a biometric feature verification enabling process, the biometric feature input by a user, the biometric feature being provided for verification of the user;
acquiring a biometric feature template identifier (ID) corresponding to the received biometric feature;
sending an authentication request to the server;
generating and saving an enable record that comprises the biometric feature template ID;
generating an enable response message that comprises the biometric feature template ID, and sending the enable response message to the server for generation and saving of a user record, the user record comprising the biometric feature template ID which is used for biometric feature verification;
receiving, from the server and in response to the authentication request, an authentication request reply message;
verifying the received authentication request reply message using the agreed-to first public key, wherein the authentication request reply message is signed by the server using the agreed-to first private key;
acquiring, using the received biometric feature, the biometric feature template ID corresponding to the received biometric feature;
determining that the acquired biometric feature template ID is consistent with a stored biometric feature template ID included in the enable record; and
in response to determining that the acquired biometric feature template ID and the stored biometric feature template ID are consistent, generating an authentication response message.

2. The computer-implemented method of claim 1, further comprising:
generating a user public key and private key pair comprising a user private key and a user public key, and saving the user private key; selecting a signature algorithm according to a challenge value included in the enable request reply message;
signing the generated enable response message by using the selected signature algorithm and an agreed-to second private key; and
sending the signed enable response message to the server, wherein the enable response message includes the user public key, the server verifying the enable response message by using the agreed-to second public key, the user public key being saved in the server.

3. The computer-implemented method of claim 2, further comprising:
selecting a signature algorithm according to a challenge value included in authentication request reply message; and
signing the authentication response message by using the selected signature algorithm and the user private key, the server selecting a signature algorithm according to the challenge value after receiving the authentication response message and verifying the authentication response message by using the signature algorithm and the user public key, the verification including verifying the signature on the authentication response message by using the signature algorithm and the user public key.

4. The computer-implemented method of claim 1, wherein the enable request reply message further comprises a user ID, the computer-implemented method further comprising after receiving the enable request reply message, saving the user ID in the enable record, wherein the enable response message further comprises the user ID, and wherein the server, after receiving the enable response message, acquires the user ID and saves the user ID in the user record.

5. The computer-implemented method of claim 4, wherein the enable response message further includes a client device ID, and wherein the server, after receiving the enable request reply message, acquires the device ID and saves the device ID in the user record.

6. The computer-implemented method of claim 4, wherein the authentication request reply message further comprises the user ID, the computer-implemented method further comprising after receiving the biometric feature input by a user and acquiring the biometric feature template ID corresponding to the biometric feature, searching for a corresponding enable record according to the user ID, comparing the acquired biometric feature template ID with the biometric feature template ID in the found enable record, wherein the generated authentication response message further includes the user ID, and wherein, after receiving the authentication response message, the server acquires the user ID and searches for the corresponding user record according to the user ID.

7. The computer-implemented method of claim 5, wherein the authentication response message further comprises the client device ID, and wherein the server, after receiving the authentication response message, acquires the device ID and searches for the corresponding user record according to the device ID.

8. A non-transitory, computer-readable medium storing one or more instructions executable by a computer system to perform operations comprising:
sending, to a server, an enable request for enabling a biometric feature;
receiving, from the server and in response to the enable request, an enable request reply message;
verifying the enable request reply message using an agreed-to first public key, wherein the enable request reply message is signed by the server using an agreed-to first private key;
receiving, during a biometric feature verification enabling process, the biometric feature input by a user, the biometric feature being provided for verification of the user;
acquiring a biometric feature template identifier (ID) corresponding to the received biometric feature;
sending an authentication request to the server;
generating and saving an enable record that comprises the biometric feature template ID;
generating an enable response message that comprises the biometric feature template ID, and sending the enable response message to the server for generation and saving of a user record, the user record comprising the biometric feature template ID which is used for biometric feature verification;
receiving, from the server and in response to the authentication request, an authentication request reply message;
verifying the received authentication request reply message using the agreed-to first public key, wherein the authentication request reply message is signed by the server using the agreed-to first private key;
acquiring, using the received biometric feature, the biometric feature template ID corresponding to the received biometric feature;
determining that the acquired biometric feature template ID is consistent with a stored biometric feature template ID included in the enable record; and
in response to determining that the acquired biometric feature template ID and the stored biometric feature template ID are consistent, generating an authentication response message.

9. The non-transitory, computer-readable medium of claim 8, the operations further comprising:
generating a user public key and private key pair comprising a user private key and a user public key, and saving the user private key;
selecting a signature algorithm according to a challenge value included in the enable request reply message; signing the generated enable response message by using the selected signature algorithm and an agreed-to second private key; and
sending the signed enable response message to the server, wherein the enable response message includes the user public key, the server verifying the enable response message by using the agreed-to second public key, the user public key being saved in the server.

10. The non-transitory, computer-readable medium of claim 9, the operations further comprising:
selecting a signature algorithm according to a challenge value included in authentication request reply message; and
signing the authentication response message by using the selected signature algorithm and the user private key, the server selecting a signature algorithm according to the challenge value after receiving the authentication response message and verifying the authentication response message by using the signature algorithm and the user public key, the verification including verifying the signature on the authentication response message by using the signature algorithm and the user public key.

11. The non-transitory, computer-readable medium of claim 8, wherein the enable request reply message further comprises a user ID, the computer-implemented method further comprising after receiving the enable request reply message, saving the user ID in the enable record, wherein the enable response message further comprises the user ID, and wherein the server, after receiving the enable response message, acquires the user ID and saves the user ID in the user record.

12. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  sending, to a server, an enable request for enabling a biometric feature;
  receiving, from the server and in response to the enable request, an enable request reply message;
  verifying the enable request reply message using an agreed-to first public key, wherein the enable request reply message is signed by the server using an agreed-to first private key;
  receiving, during a biometric feature verification enabling process, the biometric feature input by a user, the biometric feature being provided for verification of the user;
  acquiring a biometric feature template identifier (ID) corresponding to the received biometric feature;
  sending an authentication request to the server;
  generating and saving an enable record that comprises the biometric feature template ID, generating an enable response message that comprises the biometric feature template ID, and sending the enable response message to the server for generation and saving of a user record, the user record comprising the biometric feature template ID which is used for biometric feature verification;
  receiving, from the server and in response to the authentication request, an authentication request reply message;
  verifying the received authentication request reply message using the agreed-to first public key, wherein the authentication request reply message is signed by the server using the agreed-to first private key;
  acquiring, using the received biometric feature, the biometric feature template ID corresponding to the received biometric feature;
  determining that the acquired biometric feature template ID is consistent with a stored biometric feature template ID included in the enable record; and
  in response to determining that the acquired biometric feature template ID and the stored biometric feature template ID are consistent, generating an authentication response message.

13. The computer-implemented system of claim 12, the operations further comprising:
  generating a user public key and private key pair comprising a user private key and a user public key, and saving the user private key; selecting a signature algorithm according to a challenge value included in the enable request reply message;
  signing the generated enable response message by using the selected signature algorithm and an agreed-to second private key; and
  sending the signed enable response message to the server, wherein the enable response message includes the user public key, the server verifying the enable response message by using the agreed-to second public key, the user public key being saved in the server.

14. The computer-implemented system of claim 13, the operations further comprising:
  selecting a signature algorithm according to a challenge value included in authentication request reply message; and
  signing the authentication response message by using the selected signature algorithm and the user private key, the server selecting a signature algorithm according to the challenge value after receiving the authentication response message and verifying the authentication response message by using the signature algorithm and the user public key, the verification including verifying the signature on the authentication response message by using the signature algorithm and the user public key.

* * * * *